US012770002B2

(12) United States Patent
Mohammad et al.

(10) Patent No.: US 12,770,002 B2
(45) Date of Patent: Oct. 20, 2026

(54) NEGOTIATION METHOD INCLUDING SELECTION OF NEURAL NETWORK AND SYSTEM FOR IMPLEMENTING

(71) Applicant: NEC Corporation, Tokyo (JP)

(72) Inventors: Yasser Farouk Othman Mohammad, Tokyo (JP); Shinji Nakadai, Tokyo (JP)

(73) Assignee: NEC Corporation, Tokyo (JP)

( * ) Notice: Subject to any disclaimer, the term of this patent is extended or adjusted under 35 U.S.C. 154(b) by 736 days.

(21) Appl. No.: 18/317,112

(22) Filed: May 15, 2023

(65) Prior Publication Data

US 2024/0386262 A1 Nov. 21, 2024

(51) Int. Cl.
*G06N 3/08* (2023.01)
*G06Q 50/18* (2012.01)

(52) U.S. Cl.
CPC ............ *G06N 3/08* (2013.01); *G06Q 50/188* (2013.01)

(58) Field of Classification Search
CPC ........................................................ G06N 3/08
See application file for complete search history.

(56) References Cited

U.S. PATENT DOCUMENTS 11,610,131 B2 * 3/2023 Andoni .................. G06N 3/044
2002/0046157 A1 4/2002 Solomon
2014/0172522 A1 * 6/2014 Moore ............... G06Q 30/0613 705/14.1
2017/0272894 A1 9/2017 Wang et al.
2020/0327449 A1 * 10/2020 Tiwari ................... G06N 20/20
2020/0387565 A1 * 12/2020 Caglar .................... G06F 17/18
2021/0383444 A1 12/2021 Mauguin et al.
2022/0076288 A1 * 3/2022 Dey ................... G06Q 30/0239
2022/0108412 A1 4/2022 Sengupta et al.

FOREIGN PATENT DOCUMENTS

EP 1041500 A2 10/2000
EP 3594891 A1 1/2020
JP 2020013568 A 1/2020
WO 2012166107 A1 12/2012

(Continued)

OTHER PUBLICATIONS

Nesterov, “Lectures on Convex Optimization”, 2nd Ed., Springer, in “Optimization and Its Applications”, vol. 137, 2004, p. xiii (Year: 2004).*

(Continued)

*Primary Examiner* — Scott C Anderson
(74) *Attorney, Agent, or Firm* — HAUPTMAN HAM, LLP

(57) ABSTRACT

A system for selecting and using a neural architecture includes a non-transitory computer readable medium configured to store instructions thereon; and a processor connected to the non-transitory computer readable medium. The processor is configured to execute the instructions for receiving negotiation traces, wherein the negotiation traces include offers from previous negotiations with a target negotiating party. The processor is configured to execute the instructions for training the neural architecture using only the received negotiation traces. The processor is configured to execute the instructions for optimizing an offer to the target negotiating party during a negotiation using the trained neural architecture.

20 Claims, 6 Drawing Sheets

(56) References Cited

FOREIGN PATENT DOCUMENTS

| | | | | | | |
|---|---|---|---|---|---|---|
| WO | 2021/257103 | A1 | | 12/2021 | | |
| WO | 2023/032964 | A1 | | 3/2023 | | |
| WO | WO-2023217868 | A1 | * | 11/2023 | ............... | G06F 9/54 |

OTHER PUBLICATIONS

Rosebrock, "The four key ingredients when training any neural network", PYImageSearch University, May 2021 (Year: 2021).*
Beheshti, R. et al., "Predicting Opponent's Offers in Multi-Agent Negotiations Using ARTMAP Neural Network", 2009 Second International Conference on Future Information Technology and Management Engineering, IEEE, pp. 600-603, 4pp.
Matsune et al. , "Estimation of Opponents' Utility Functions using Boosting for Multi-times Negotiations", 2017, The 31st Annual Conference of the Japanese Society for Artificial Intelligence. 4pp.
Li et al., "A Data-Driven Method for Recognizing Automated Negotiation Strategies", 2021, arXiv, 17pp.
International Search Report in PCT/JP2024/017246, mailed Jul. 16, 2024. 4pp.

* cited by examiner

NEGOTIATION METHOD INCLUDING SELECTION OF NEURAL NETWORK AND SYSTEM FOR IMPLEMENTING

BACKGROUND

As commerce using the Internet has increased, autonomous negotiations have also increased. Autonomous negotiation utilizes artificial intelligence (AI) in place of human negotiators in order to attempt to reach agreements between parties. AI is used to evaluate an offer from an opponent and then determine a response to the offer. In some instances, the response is a counteroffer. In some instances, the response is acceptance of the offer. In some instances, the response is to end the negotiation.

In some approaches, an AI negotiator is fully trained with user preferences and priorities prior to beginning of a negotiation. In some approaches, an AI negotiator includes some minor uncertainty regarding user preferences and priorities at the beginning of a negotiation. In some approaches, the AI negotiator is able to submit a query to the user in order to reduce uncertainty of user preferences and priorities. However, the query merely inquiries about how valuable a specific parameter is to the user without asking a user preference between options.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
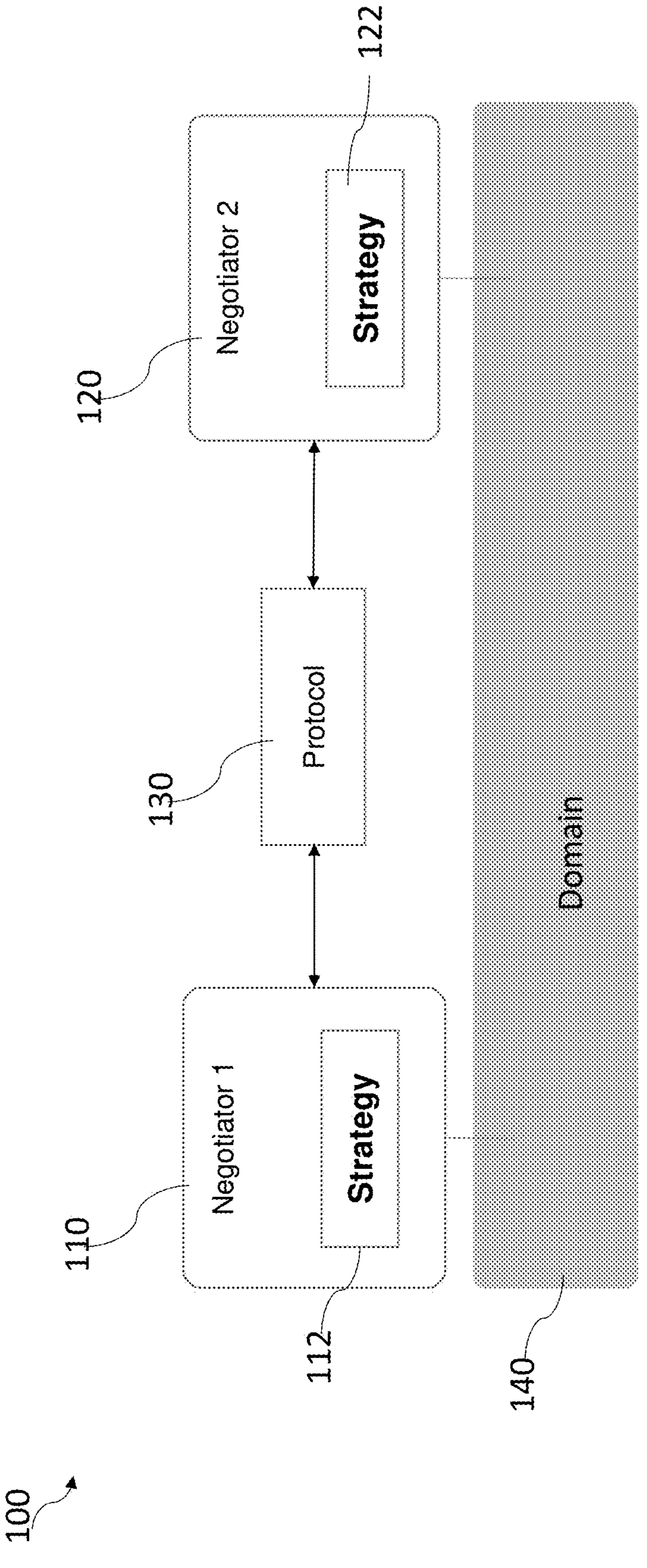
FIG. 1 is a schematic view of a negotiation in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Negotiations utilizing automated systems is used in order to increase the speed of reaching a resolution between multiple self-interested parties. Each of the self-interested parties seeks to maximize the value, or utility function, of the result of the negotiation. However, each of the self-interested parties also seeks to avoid alienating the other self-interested parties by avoiding offers or proposals that are completely antithetical to the other self-interested parties. By known what criteria are most valuable to other self-interested parties, a negotiation system is able to generate offers and proposals that are most likely to improve the value for a user of the negotiation system while avoiding alienating or damaging a relationship with other self-interested parties in the negotiation. In some instances, this type of situation is called reducing the pareto-frontier distance.

Reviewing of previous negotiations involving the other self-interested parties, also called parties in this description, helps to determine which criteria are valued by the other parties. This description includes a system for generating a neural network based on past negotiations performed by the other parties. In some embodiments, the negotiations include offers, counteroffers, acceptances, refusals or other negotiations procedures. The individual negotiations procedures are called negotiation traces or trances, in some embodiments. These traces are usable to generate a neural network or adapt an existing neural network for negotiating with the parties involved in the previous negotiations. In some embodiments, the past negotiations are in a same domain as a proposed negotiation. In some embodiments, the past negotiations are in a different domain from the proposed negotiation. As a similarity between the domain of the proposed negotiation and the past negotiations increases, precision and accuracy of the predictions and offers generated by the neural network increase.

In some instances, priorities for a party change as business situations change for that party. In some embodiments, the system includes an ability to evaluate an on-going negotiation to determine whether the neural network currently in use during the negotiation is satisfactorily predicting offers and counteroffers from the other parties. In response to a determination that the system is failing to satisfactorily predict offers and counteroffers from the other parties, the system is able to recommend a change in the neural network in order to improve accuracy in predicting actions by the other parties. In some embodiments, the system recommends a replacement neural network based on traces received during the on-going negotiation. While the following description focuses primarily on a two-party negotiation, one of ordinary skill in the art would understanding that the current application is not limited to a two-negotiation and that other multi-party negotiations are capable of being performed and evaluated by the system described in this application.

FIG. 1 is a schematic view of a negotiation 100 using an autonomous negotiation method in accordance with some embodiments. The negotiation 100 includes a first negotiator 110 including a first strategy 112. The negotiation 110 includes a second negotiator 120 including a second strategy 122. A protocol 130 is used to determine the style of negotiation between the first negotiator 110 and the second negotiator 120. A domain 140 includes the issues to be resolved in the negotiation 100. The negotiation 100 is a bilateral negotiation. However, the current disclosure is not limited to only bilateral scenarios.

The first negotiator 110 includes AI algorithms for determining priorities for the issues to be resolved. These priorities are captured in utility values associated with each of the issues to be resolved. That first negotiator 110 uses these utility values to prioritize possible outcomes from the negotiation 100. The first negotiator 110 is able to communicate with the second negotiator 120 using the protocol 130. In some embodiments, the first negotiator 110 is able to communicate wirelessly. In some embodiments, the first negotiator 110 is able to communicate using a wired connection. In some embodiments, the first negotiator 110 is able to communicate via the Internet. The first negotiator 110 is able to transmit an offer, counteroffer, acceptance or rejection to the second negotiator 120. The first negotiator 110 is autonomous, i.e., operating without user input or control.

The first strategy 112 is the action determined by the first negotiator 110 based on the utility values and algorithm used by the first negotiator 110. In some embodiments, the first strategy 112 includes an offer, a counteroffer, an acceptance or a rejection. In some embodiments, the first strategy 112 changes during the negotiation 100 based on new information received from the second negotiator 120.

The second negotiator 120 includes AI algorithms for determining priorities, captured using utility values, for the issues to be resolved. The second negotiator 120 is able to communicate with the first negotiator 110 using the protocol 130. In some embodiments, the second negotiator 120 is able to communicate wirelessly. In some embodiments, the second negotiator 120 is able to communicate using a wired connection. In some embodiments, the second negotiator 120 is able to communicate via the Internet. The second negotiator 120 is able to transmit an offer, counteroffer, acceptance or rejection to the first negotiator 110. In some embodiments, hardware for the first negotiator 110 is the same as the hardware for the second negotiator 120. In some embodiments, hardware for the first negotiator 110 is different from the hardware for the second negotiator 120. In some embodiments, the algorithms implemented in the first negotiator 110 are the same as the algorithms implemented in the second negotiator 120. In some embodiments, the algorithms implemented in the first negotiator 110 are different from algorithms implemented in the second negotiator 120. In some embodiments, the second negotiator 120 is autonomous. In some embodiments, the second negotiator 120 is controlled based on user input.

The second strategy 122 is the action determined by the second negotiator 120 based on the utility values and algorithm used by the second negotiator 120. In some embodiments, the second strategy 122 includes an offer, a counteroffer, an acceptance or a rejection. In some embodiments, the second strategy 122 changes during the negotiation 100 based on new information received from the first negotiator 110.

The protocol 130 is the rules for the negotiation 100. For example, in an alternating offers protocol, the negotiators, e.g., the first negotiator 110 and the second negotiator 120, exchange offers in an alternating fashion. In some embodiments, the protocol 130 is an alternating offers protocol. In some embodiments, the protocol 130 is a different protocol, such as time based offers, or other suitable protocols. The protocol 130 is established prior to beginning the negotiation 100 so that the first negotiator 110 and the second negotiator 120 know when and whether an offer or reply should be transmitted. In some embodiments, the protocol 130 includes a maximum number of steps, e.g., offers. In some embodiments, the protocol 130 includes a time limit for the negotiation 100.

The domain 140 includes the issues to be resolved. For example, the issues to be resolved, in some embodiments, include price, quantity, brand name, etc. In some embodiments, the domain 140 includes a single issue. In some embodiments, the domain 140 includes multiple issues. Each of the first negotiator 110 and the second negotiator 120 knows the domain 140 and attributes a utility value to combinations of the issues to be resolved. For example, where the domain 140 includes price and brand name and there are two options for each of price and brand name, the first negotiator 110 will have four different utility values, i.e., one for each possible combination. In some embodiments, the first negotiator 110 and the second negotiator 120 have utility values for less than all possible combinations. In some embodiments, the utility values assigned by the first negotiator 110 are different from the utility values assigned by the second negotiator 120 because the first and second negotiators have different priorities.

Figure 2:
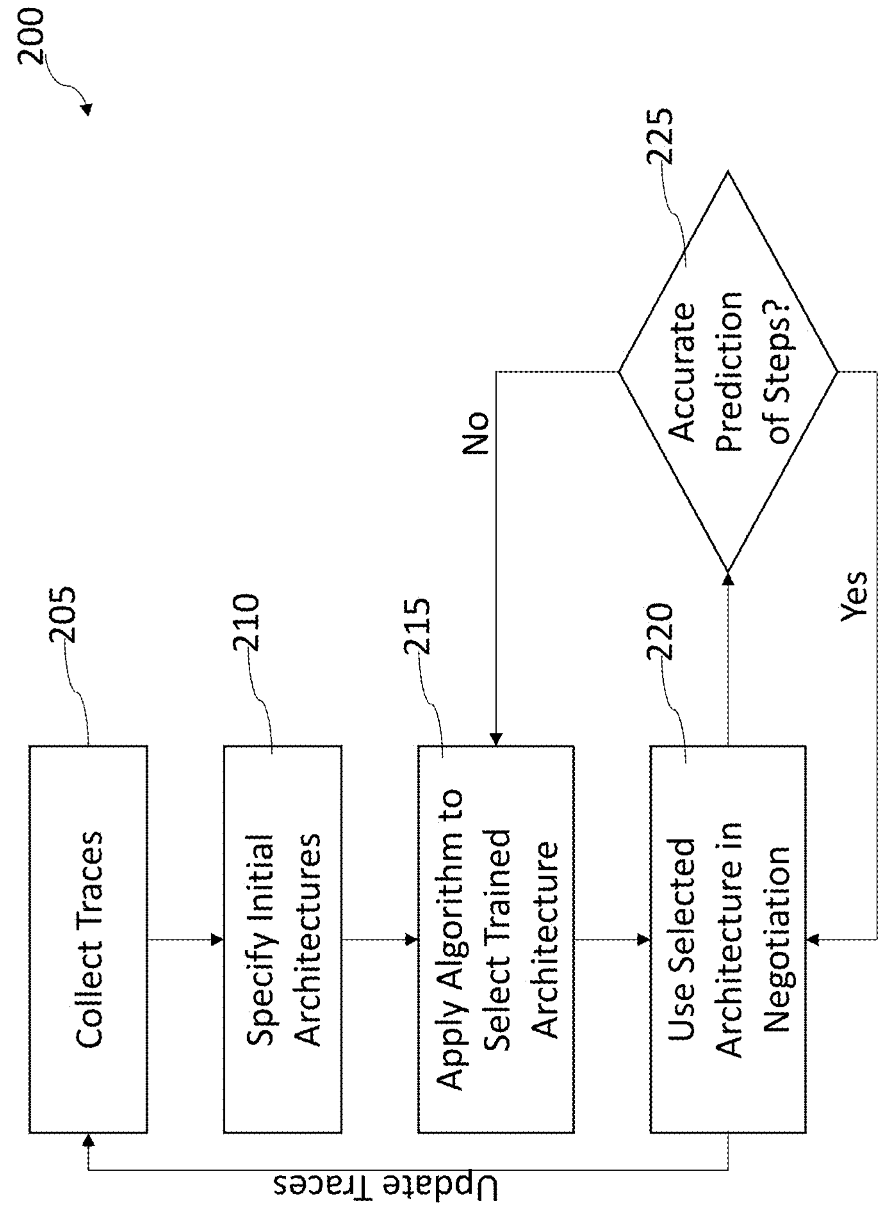
FIG. 2 is flowchart of a method of selecting a negotiating neural network in accordance with some embodiments.

FIG. 2 is flowchart of a method 200 of selecting a negotiating neural network in accordance with some embodiments. In some embodiments, the method 200 is usable to create a new neural network based on a target negotiating party. In some embodiments, the method 200 is usable to select a neural network from among existing neural network based on the target negotiating party. In some embodiments, the method 200 is usable to update a neural network during a negotiation. In some embodiments, the method 200 is usable to switch between neural networks during a negotiation. One of ordinary skill in the art would recognize that the method 200 is usable to implement any of the above usages in isolation or in combination. A target negotiating party is a party with which a user of the neural network intends to negotiate. In some embodiments, the method 200 is usable to select or change a neural network for implementing the negotiation 100 (FIG. 1). In some embodiments, the method 200 is usable to select or change a neural network for implementing a negotiation different from the negotiation 100 (FIG. 1).

In the operation 205, traces are collected. Traces are results of previous negotiations with the target negotiating party. In some embodiments, the traces include offers, counteroffers, acceptances, refusals, or other suitable responses during a negotiation. While the traces include final accepted terms, in some embodiments, the traces also include intermediate exchanges during the negotiation. In some embodiments, the traces are collected from stored data in a database based on previous automated negotiations with the target negotiating party. In some embodiments, the traces are collected from other sources such as emails, transcripts, scanned documents, or other suitable sources of exchanges during previous negotiations with the target negotiating party. By limiting the traces to the target negotiating party, the method 200 is able to arrive at a neural network that focuses on the priorities of the target negotiating party instead of a more generic neural network usable in negotiations with other parties. As a result, the method 200 is able to produce a higher value negotiation result when negotiating with the target negotiating party in comparison with other generic approaches.

In operation 210, initial architectures are specified. The initial architecture is usable to determine a structure of a neural network and to train the neural network to negotiate with the target negotiating party. In some embodiments, the neural network is usable to predict the second strategy 122

(FIG. 1) of an opponent in the negotiation. In some embodiments, details of the operation 210 are described with respect to the method 300 (FIG. 3), discussed below. In some embodiments, a single initial architecture is defined. In some embodiments, multiple initial architectures are defined in order to provide a variety of options during the a future negotiation. In some embodiment, the initial architecture defines parameters of the neural network, such as depth, width, specifier or other suitable parameters. The depth of the neural network defines a number of layers of the neural network. As a number of layers increases, accuracy of the neural network increases; however, processing power utilized to implement the neural network also increases. The width of the neural network determines how many nodes are present within each layer of the neural network. As the number of nodes per layer increases, accuracy of the neural network increases; however, processing power utilized to implement the neural network also increases. The specifier determines the type of architecture used to form the neural network. In some embodiments, the specifier is selected from long short term memory (LSTM), gated recurrent units (GRU), transformer, convoluted neural network (CNN), fully connected layers (FCL), or other suitable types of architectures. In some embodiments, each of the neural networks generated in operation 210 include the same initial architecture, but have different node weights following training. In some embodiments, at least one neural network generated in operation 210 has a different architecture from at least one other neural network. Utilizing different architectures helps to provide different options for utilizing neural networks during a future negotiation with the target negotiating party.

In some embodiments, input parameters are utilized to help train the one or more initial architectures. In some embodiments, the input parameters include channels, type, cardinality, or other suitable input parameters. The input parameters are fed into the initial architecture and the outputs of the initial architecture are compared with the traces collected in operation 205 to help train the initial architecture utilizing the collected traces.

Channels include a value for each offer or counteroffer in the negotiation. In some embodiments, the channel includes an outcome of the offer or counteroffer, a self-utility function, a predicted opponent utility function, context, time, round, or other suitable parameters. One of ordinary skill in the art would understand that the above parameters for the channels are usable individually or in any combination. The outcome indicates a response to the offer of counteroffer. The self-utility function determines the value of the offer or counteroffer to the user of the neural network. The predicted opponent utility function is a predicted value of the offer or counteroffer to the target negotiating party. The context includes additional available information about the target negotiating party, such as stock price, economic performance, or other available information. The time indicates a time within the negotiation at which the offer or counteroffer was made. Some negotiations are set to terminate after a specific time period if no acceptance is reached prior to the end of the time period. The time parameter indicates how far along into the time period the offer or counteroffer was made. The round indicates a round at which the offer or counteroffer was made. Some negotiations are set to terminal after a specific number of rounds of offers and counteroffers if no acceptance is reached. The round parameter indicates how far into the negotiation the offer or counteroffer was made.

The type parameter includes what information is being utilized for the channels. In some embodiments, the type parameter includes overall history, self-policy, opponent policy, or other suitable types of information. The overall history includes results for both the user of the neural network and the target negotiating party. The self-policy includes information related to how the user of the neural network responded during the traces. The opponent policy includes information related to how the target negotiating party responded during the traces. The overall history provides a more precise and accurate trained neural network because the responses of both parties are considered. However, the processing time for training the neural network increases due to the increase in the amount of data provided to train the initial architecture.

The cardinality parameter includes how many offers or counteroffers are input into the initial architecture for training of the neural architecture. The cardinality is able to range from a user selected portion of the available data to all available data. As the number of offers and counteroffers input to train the initial architecture increase, the accurate and precision of the neural network increases. However, the processing time for training the neural network also increases due to the increase in the amount of data provided to train the initial architecture.

In operation 215, an algorithm is applied to select which of the trained architectures from operation 210 to utilize in a negotiation with the target negotiating party. In some embodiments, the algorithm includes having the one or more trained architectures negotiate against one another. In some embodiments, the algorithm includes having the trained architecture attempt to replicate a previous negotiation. In some embodiments, the operation 215 is omitted when a single trained architecture is generated in operation 210.

In some embodiments, the selection of a trained architecture is based on an evaluation of predications of the action of the target negotiating party as well as predictions of the response of the user of the neural network to the action of the target negotiating party. In some embodiments, the selection is made based on which of the trained architecture has a highest degree of accuracy in predicting the actions of the target negotiating party and/or the responses of the user of the neural network. In some embodiments, the selection is made based on which of the trained architecture produces a highest value outcome for the user of the neural network.

In operation 220, the selected trained architecture is utilized in a negotiation with the target negotiating party. In some embodiments the operation 220 includes a negotiation similar to the negotiation 100 (FIG. 1). During each exchange of offer or counteroffer during the operation 220, traces are provided back to operation 205 for generation of new architectures or re-training of existing architectures.

In some embodiments, following operation 220, the operation 225 is executed. In some embodiments, the operation 225 is execute after every offer or counteroffer received from the target negotiating party. In some embodiments, following a predetermined progression with the negotiation, the method 200 proceeds to operation 225. In some embodiments, the predetermined progress is determined based on an input of the user of the neural network. In some embodiments, the predetermined progression includes a percentage of elapsed time of the negotiation versus a maximum time permitted for the negotiation. In some embodiments, the predetermined progression includes a percentage of elapsed rounds of negotiation versus a maximum number of rounds permitted for the negotiation.

In operation 225, a performance of the trained architecture utilized in operation 220 is evaluated to determine whether to continue using the same trained architecture as the negotiation progress; or whether to switch to a different trained architecture for subsequent steps in the negotiation. In some embodiments, the operation 225 is performed a single time during the negotiation. In some embodiments, the operation 225 is performed multiple times during the negotiation. In some embodiments, a determination regarding whether the trained architecture is accurately predicting the steps of the negotiation is based on a difference between the offers or counteroffers received from the target negotiating party and the predicted offers or counteroffers from the trained architecture. In some embodiments, the difference is based on a value to the user of the neural network for the offer or counteroffer. In some embodiments, the difference is based on a predicted value to the target negotiating party for the offer and counteroffer. In some embodiments, the accuracy is determined based on a threshold value to account for small variations in negotiation with the target negotiating party. In some embodiments, the threshold is adjusted as the negotiation progresses. For example, in some embodiments, the threshold decreases as the negotiation progresses meaning that less inaccuracy by the trained architecture used in operation 220 is tolerated later in the negotiation.

Utilizing operation 225 helps the method 200 to improve value for the user of the neural network in situations where the target negotiating party adjusts negotiating strategies in comparison with past negotiations. For example, as the target negotiating party grows in size, speed of delivery of a product becomes more important than price of the product in some instances. As a result, the traces utilized to train the architectures in operation 210 are less accurate in predicting the actions of the target negotiating party during the negotiation of operation 220. Therefore, adjusting negotiating strategy for the user helps improve value of the negotiation for the user.

In response to a determination that the accuracy of the trained architecture utilized in operation 220 is satisfactory, the method 200 returns to operation 220 and the negotiation continues with the previously selected trained architecture. In response to a determination that the accuracy of the trained architecture utilized in operation 220 is unsatisfactory, the method 200 returns to operation 215 and a trained architecture different from that previously used in operation 220 for the current negotiation is selected. In some embodiments, the method 200 prevents the operation 215 from selecting any trained architecture previously used in the on-going negotiation in a subsequent iteration of the operation 215. By preventing selection of a previously used trained architecture that has already proved to be unsatisfactory for a current negotiation, the method 200 improves the likelihood of a higher value result for the user of the neural network.

One of ordinary skill in the art would recognize that changes in the method 200 are within the scope of this description. In some embodiments, an order of operations of the method 200 is changed. For example, in some embodiments, a structure of a neural network architecture is defined prior to collecting traces for use in training the architecture. In some embodiments, additional operations are included in the method 200. For example, in some embodiments, the user is prompted to input criteria for determining satisfactory accuracy of the selected trained architecture. In some embodiments, at least one operation of the method 200 is omitted. For example, in some embodiments that include only a single trained architecture, the operation 225 is omitted.

The method 200 utilizes only the collected traces for training the architectures of the neural network. As a result, the trained architectures are targeted to improve value for the user when negotiating with the target negotiating party. This approach is especially advantageous for the user in situations where the user often negotiates with the target negotiating party. Additionally, the method 200 provides feedback during future or on-going negotiations for developing new architectures or re-training existing architectures. As a result, value for the user is likely to improve during future negotiations with the target negotiating party. Further, the method 200 provides an automated switching between trained architectures to account for potential adjustments to negotiating strategies of the target negotiating party in comparison to previous negotiations. This allows the method 200 to help maintain or improve value of the negotiation as the needs and desires for the target negotiating party evolve over time.

Figure 3:
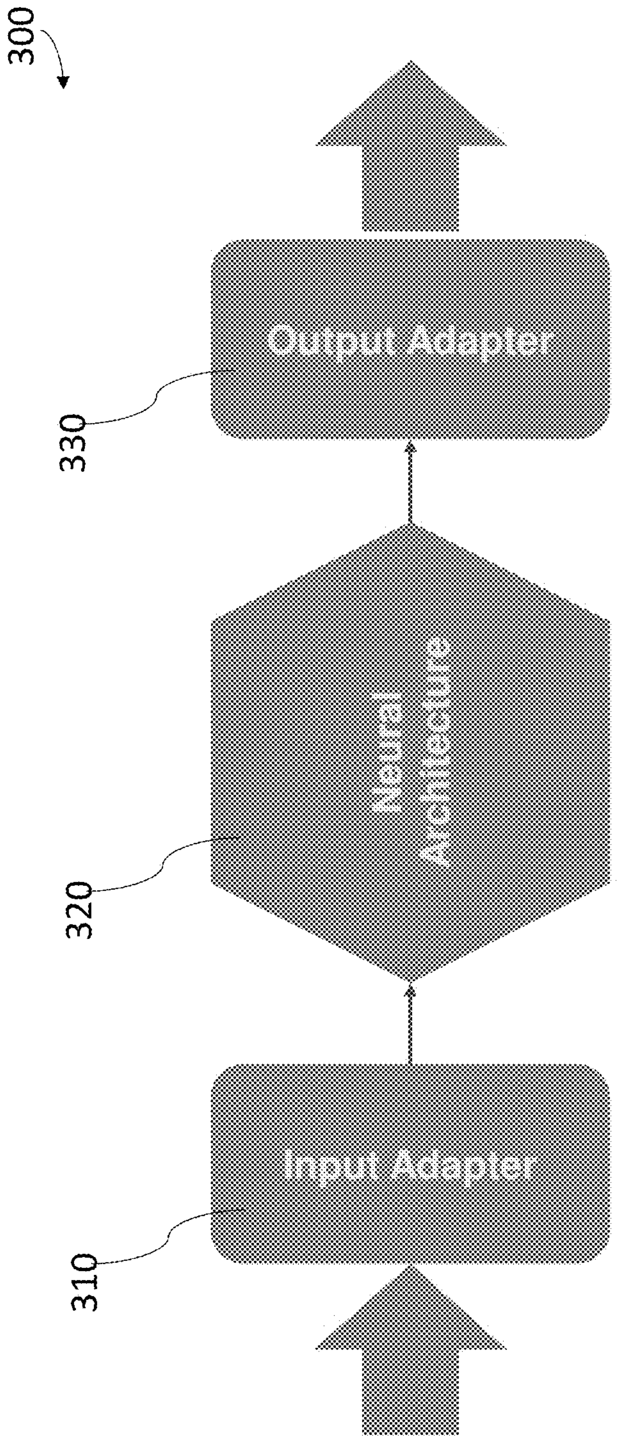
FIG. 3 is a schematic diagram of a method of building a neural network in accordance with some embodiments.

FIG. 3 is a schematic diagram of a method 300 of building a neural network in accordance with some embodiments. In some embodiments, the method 300 is usable to implement the operation 210 of the method 200 (FIG. 2). In some embodiments, the method 300 is usable to develop a negotiator, e.g., negotiator 110, in negotiation 100 (FIG. 1). In some embodiments, the method 300 is usable to develop and train a neural network usable in a method other than the method 200 (FIG. 2) or in the negotiation 100 (FIG. 1).

The method 300 includes utilizing an input adapter at operation 310 to enter input parameters into a neural architecture. The input parameters are utilized to help train the one or more initial architectures. In some embodiments, the input parameters include channels, type, cardinality, or other suitable input parameters. Examples of the channels, type and cardinality parameters are discussed above and are not repeated here in detail for the sake of brevity. In some embodiments, values of the input parameters are based on available traces for a target negotiating party. In some embodiments, the user is able to select from the available traces to determine the input parameters. In some embodiments, the user selects a number of input parameters to use for training the neural architecture and a system, such as system 600 (FIG. 6), is utilized to select traces to use as input parameters based on the input received from the user. In some embodiments, the most recent traces that satisfy the user input are selected as the input parameters. In some embodiments, traces that satisfy the user input are randomly selected as the input parameters.

The method 300 further includes generating a neural architecture in operation 320. In some embodiments, a single initial architecture is defined. In some embodiments, multiple initial architectures are defined in order to provide a variety of options during the a future negotiation. In some embodiment, the initial architecture defines parameters of the neural network, such as depth, width, specifier or other suitable parameters. The depth of the neural network defines a number of layers of the neural network. As a number of layers increases, accuracy of the neural network increases; however, processing power utilized to implement the neural network also increases. The width of the neural network determines how many nodes are present within each layer of the neural network. As the number of nodes per layer increases, accuracy of the neural network increases; however, processing power utilized to implement the neural network also increases. The specifier determines the type of architecture used to form the neural network. In some embodiments, the specifier is selected from LSTM, GRU, transformer, CNN, FCL, or other suitable types of architectures. In some embodiments, each of the neural networks generated in operation 320 include the same initial architecture, but have different node weights following training. In some embodiments, at least one neural network generated in operation 320 has a different architecture from at least one other neural network. Utilizing different architectures helps to provide different options for utilizing neural networks during a future negotiation with the target negotiating party.

The method 300 further includes receiving output parameters utilizing an output adapter 330. The output parameters are output from the neural architecture. By comparison the output parameters with actual data from the traces, an accuracy of the neural architecture is determined and weights within the nodes of the neural architecture are able to be adjusted as part of a training process for the neural architecture.

One of ordinary skill in the art would recognize that the method 300 is capable of training multiple different neural architectures. Training more neural architectures provides additional options for use during negotiations, such as being able to switch between trained architectures during a negotiation. However, training more neural architectures increases processing load on the system utilize to train the neural architecture.

The method 300 utilizes only the traces from previous negotiations with the target negotiating party for training the architectures of the neural network. As a result, the trained architectures are targeted to improve value for the user when negotiating with the target negotiating party. This approach is especially advantageous for the user in situations where the user often negotiates with the target negotiating party.

Figure 4:
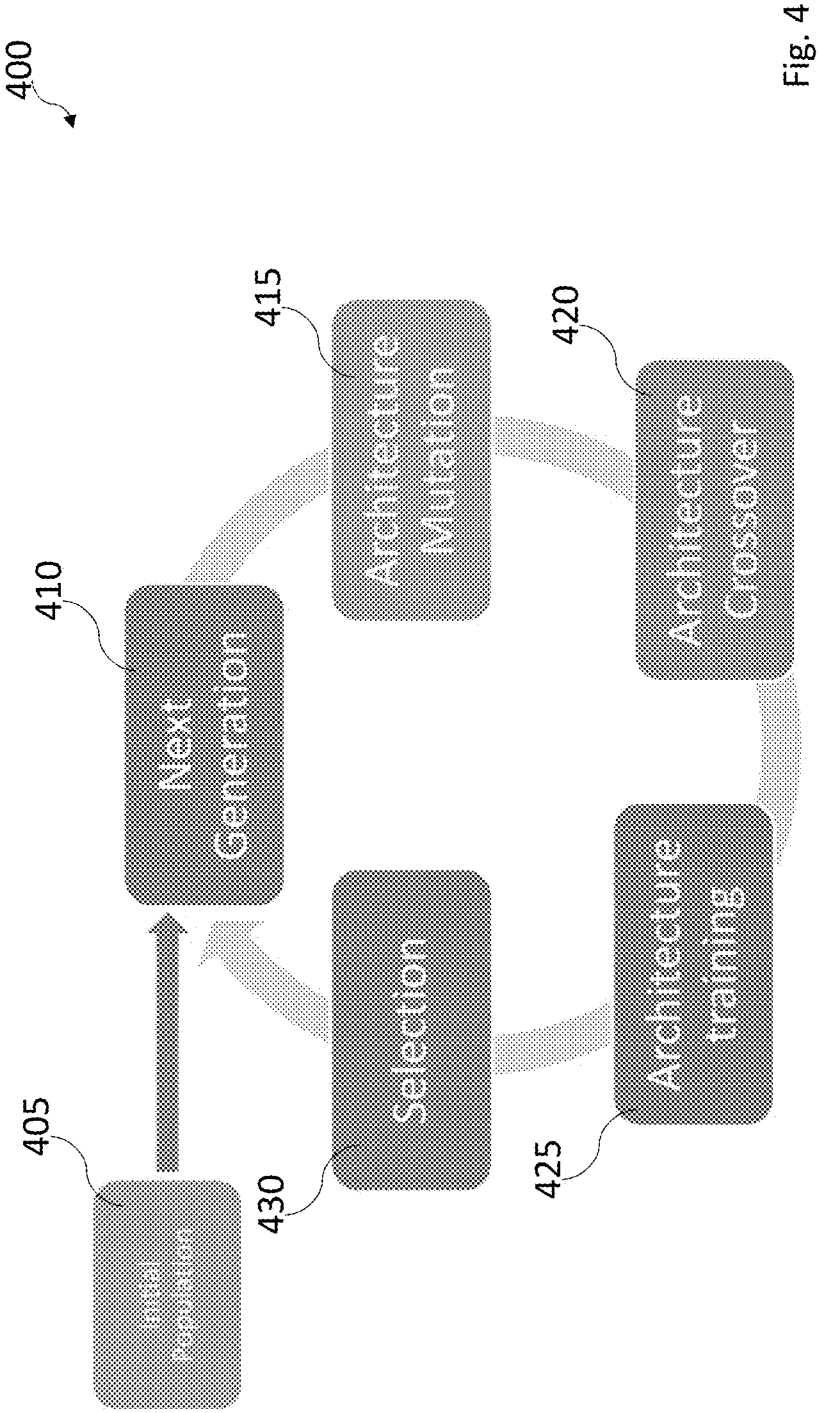
FIG. 4 is a schematic diagram of a method of building and re-training neural networks in accordance with some embodiments.

FIG. 4 is a schematic diagram of a method 400 of building and re-training neural networks in accordance with some embodiments. In some embodiments, the method 400 is used in combination with the method 200 (FIG. 2) or the method 300 (FIG. 3) to generate one or more trained neural architectures for executing a negotiation, such as negotiation 100 (FIG. 1). In some embodiments, the method 400 is usable with a method other than the method 200 (FIG. 2) or the method 300 (FIG. 3) to generate and select a neural architecture for a negotiation other than the negotiation 100 (FIG. 1). The method 400 includes receiving of an initial set of data and repeatedly re-training and updating neural architectures in order to help improve value in future negotiations with the target negotiating party.

In operation 405, an initial population of trained neural architectures is received. In some embodiments, the initial population includes a single trained neural architecture. In some embodiments, the initial population includes multiple trained neural architectures. In some embodiments, the initial population is generated using the method 300 (FIG. 3). In some embodiments, the initial population is generated using a method other than the method 300 (FIG. 3). In some embodiments, the initial population is stored in a database for selection and re-training during subsequent iterations of the method 400.

In operation 410, a next generation of trained neural architectures is stored in a database for selection during a future negotiation. In a first iteration of the method 400, the next generation is equal to the initial population. In some iterations at least one trained neural architecture from a previous iteration is not updated by the method 400.

In operation 415, a determination is made regarding whether to mutate one or more of the trained neural architectures. Mutation allows the architecture to adjust weights for one or more nodes while simultaneously adjusting a structure of the architecture. In some embodiments, the determination is made to adjust a width or a depth of a neural architecture in response to an inability to get the neural architecture to converge with a sufficient degree of accuracy.

In operation 420, architecture crossover is performed. Architecture crossover is where one or more nodes from a first architecture are imported into a second architecture. In some instances, the crossover helps to avoid premature convergence in a situation where the architecture is not satisfactorily accurate. In some instances, the crossover helps to improve accuracy of the second architecture in a situation where one or more nodes within the second architecture are identified as a likely source of inaccuracies.

In operation 425, the mutated and/or crossover architectures are trained. The architecture training is performed using traces from the target negotiating party in order to help improve value for results of future negotiations with the target negotiating party. In some embodiments, the training is performed using a weighted loss function or another suitable loss function.

In operation 430, a selection of a trained architecture is performed in order to identify which trained architecture will be used at a start of a next negotiation with the target negotiating party. In some embodiments, the trained architecture will be switched during the negotiation, as discussed above with respect to method 200 (FIG. 2). In some embodiments, the selection is performed by having trained architectures compete against one another based on traces or based on a simulated negotiation with the target negotiating party.

The method 400 proceeds from operation 430 to operation 410. In some embodiments, the selected trained architecture from operation 430 is identified in the next generation in order to assist with mutation, crossover and selection during a subsequent iteration of the method 400.

The method 400 utilizes only the traces from previous negotiations with the target negotiating party for training the architectures of the neural network. As a result, the trained architectures are targeted to improve value for the user when negotiating with the target negotiating party. This approach is especially advantageous for the user in situations where the user often negotiates with the target negotiating party.

Figure 5:
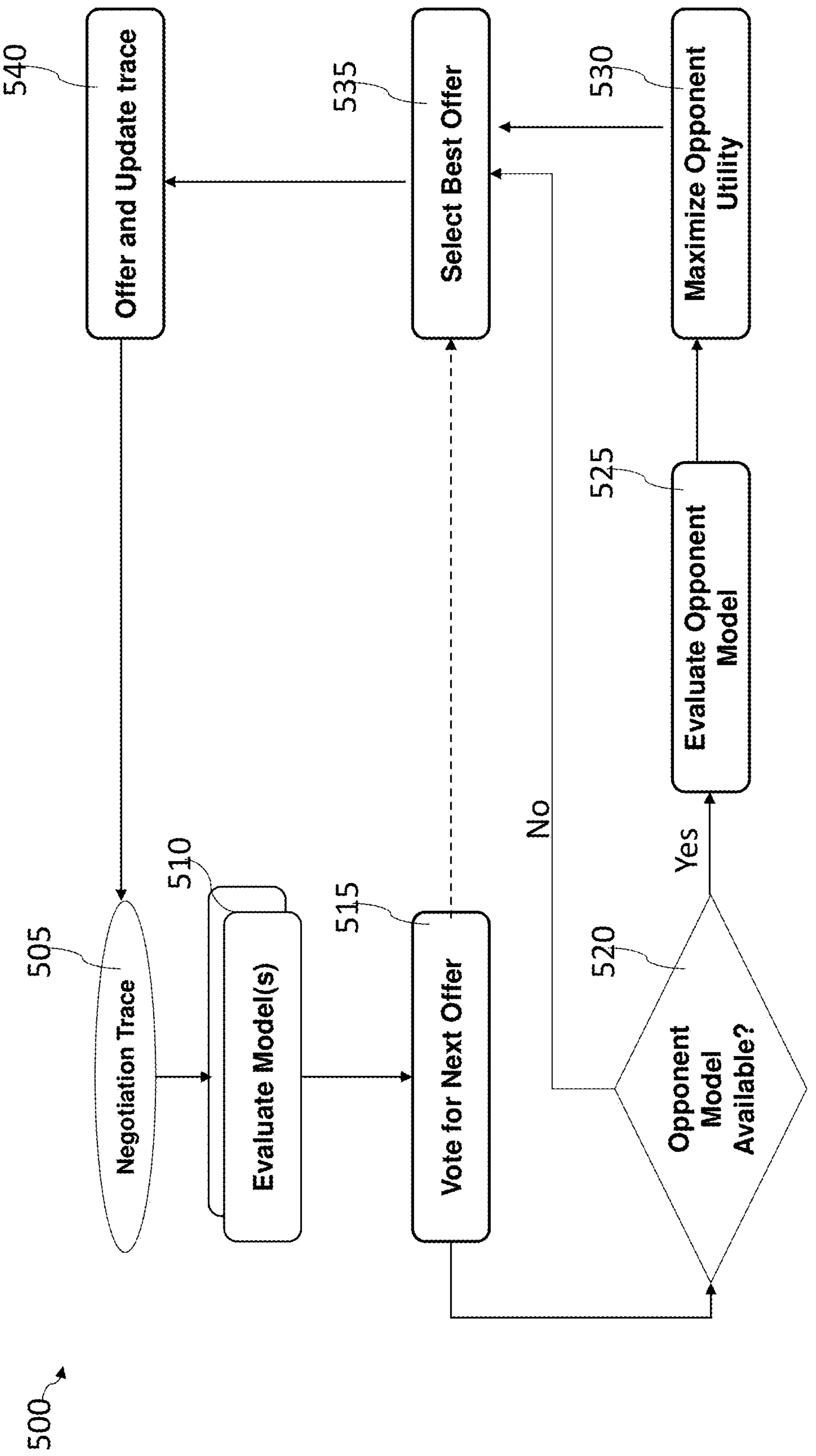
FIG. 5 is a flowchart of a method of selecting a response to an offer in accordance with some embodiments.

FIG. 5 is a flowchart of a method 500 of selecting a response to an offer in accordance with some embodiments. The method 500 includes multiple trained architectures or models. One of ordinary skill in the art would understand that in some embodiments, the method 500 relies on a single trained architecture or model. In some embodiments, the method 500 is used in combination with the method 200 (FIG. 2), the method 300 (FIG. 3) or the method 400 (FIG. 4) to determine an offer as part of a negotiation, such as negotiation 100 (FIG. 1). In some embodiments, the method 500 is usable with a method other than the method 200 (FIG. 2), the method 300 (FIG. 3) or the method 400 (FIG. 4) to determine an offer for a negotiation other than the negotiation 100 (FIG. 1).

In operation 505, negotiation traces are received. In some embodiments, the traces include offers, counteroffers, acceptances, refusals, or other suitable responses during a negotiation. While the traces include final accepted terms, in some embodiments, the traces also include intermediate exchanges during the negotiation. In some embodiments, the traces are collected from stored data in a database based on previous automated negotiations with the target negotiating party. In some embodiments, the traces are collected from other sources such as emails, transcripts, scanned documents, or other suitable sources of exchanges during previous negotiations with the target negotiating party. By limiting the traces to the target negotiating party, the method 500 is able to arrive at select and utilize a neural network that focuses on the priorities of the target negotiating party instead of a more generic neural network usable in negotiations with other parties. As a result, the method 500 is able to produce a higher value negotiation result when negotiating with the target negotiating party in comparison with other generic approaches.

In operation 510, the available trained models are evaluated to determine which trained model to use in the negotiation. In some embodiments that include a single trained model, the operation 510 is skipped. In some embodiments, multiple models are selected and the selected multiple models will "vote" for the offer in operation 515, discussed below. An algorithm is used to evaluate the models. In some embodiments, the algorithm includes having the one or more trained architectures negotiate against one another. In some embodiments, the algorithm includes having the trained architecture attempt to replicate a previous negotiation.

In some embodiments, the selection of a trained architecture is based on an evaluation of predications of the action of the target negotiating party as well as predictions of the response of the user of the neural network to the action of the target negotiating party. In some embodiments, the selection is made based on which of the trained architecture has a highest degree of accuracy in predicting the actions of the target negotiating party and/or the responses of the user of the neural network. In some embodiments, the selection is made based on which of the trained architecture produces a highest value outcome for the user of the neural network.

In operation 515, the selected model or models vote for a next offer to be sent to the target negotiating party. In embodiments that include a single trained model, the single trained model selects the next offer to be sent to the target negotiating party. In some embodiments, the include multiple selected trained models, each of the selected train models proposes an offer including one or more parameters; a sum is determined for each of the parameters across the models; and an offer having parameters having a highest total value is determined to be a winner of the voting. An output of the voting is used in the operation 535, discussed below.

In operation 520, a determination is made regarding whether a predicted opponent model is available. The predicted opponent model is a prediction of a neural network utilized by the target negotiating party. In some embodiments, the predicted opponent model is generated, e.g., using the method 300 (FIG. 3), based on the negotiation traces received in operation 505. In response to a determination that a predicted opponent model is available, the method 500 proceeds to operation 525. In response to a determination that no predicted opponent model is available, the method 500 proceeds to operation 535.

In operation 525, the predicted opponent model is evaluated. The operation 525 is similar to the operation 510 except the one or more models being evaluated are the predicted opponent model or models. In some embodiments where a single predicted opponent model is available, the operation 525 is skipped.

In operation 530, an offer which maximizes the opponent utility is determined using the one or more predicted opponent models. Maximizing the opponent utility means that a predicted value to the opponent is maximized based on the predicted opponent model. The operation 530 is similar to the operation 515 except the selection of an offer is being made based on the predicted opponent model.

In operation 535, a best offer is selected. In embodiments where the predicted opponent model is unavailable, then the operation 535 selects the offer from operation 515. In some embodiments where the predicted opponent model is available, the operation 535 compares the offer from operation 515 and the offer from operation 530.

In some embodiments, the operation 535 selects the offer received from operation 515 in response to the negotiation being equal to or less than a threshold period into the negotiation. In some embodiments, the operation 535 selects the offer received from operation 530 in response to the negotiation being beyond the threshold period into the negotiation. That is, the operation 535 selects the offer most beneficial to the user during an earlier part of the negotiation; and the operation 535 selects the offer predicted to be most valuable to the opponent near the end of the negotiation. This approach allows the method 500 to attempt to obtain a highest value for the user while minimizing a risk of failing to reach any agreement during the negotiation. In some embodiments, the threshold is approximately 95% of a maximum period, e.g., rounds or time, into the negotiation. In some embodiments, the offer received from the operation 530 is rejected in response to a determination that one or more of the parameters of the offer are not acceptable by the user based on input received from the user.

In operation 540, the offer is transmitted to the opponent and the traces are updated. The updated traces are fed back into operation 505 for determining a next offer to the opponent; for generating additional architectures; or for re-training one or more existing architectures. The method 500 is repeated until an agreement is reached within the negotiation; or until a period of the negotiation, e.g., rounds or time, has expired.

One of ordinary skill in the art would recognize that changes in the method 500 are within the scope of this description. In some embodiments, an order of operations of the method 500 is changed. For example, in some embodiments, evaluation of the neural models is performed prior to initiating the negotiation. In some embodiments, additional operations are included in the method 500. For example, in some embodiments, a determination is made during the negotiation regarding whether to switch to a different trained model for future offer determinations. In some embodiments, at least one operation of the method 500 is omitted. For example, in some embodiments that include only a single trained architecture, the operation 510 is omitted.

The method 500 utilizes only the collected traces for evaluating the models of the neural network. As a result, the selected models are targeted to improve value for the user when negotiating with the target negotiating party. This approach is especially advantageous for the user in situations where the user often negotiates with the target negotiating party. Additionally, the method 500 provides feedback during future or on-going offer determinations for developing re-evaluating models. As a result, value for the user is likely to improve during negotiations with the target negotiating party.

Figure 6:
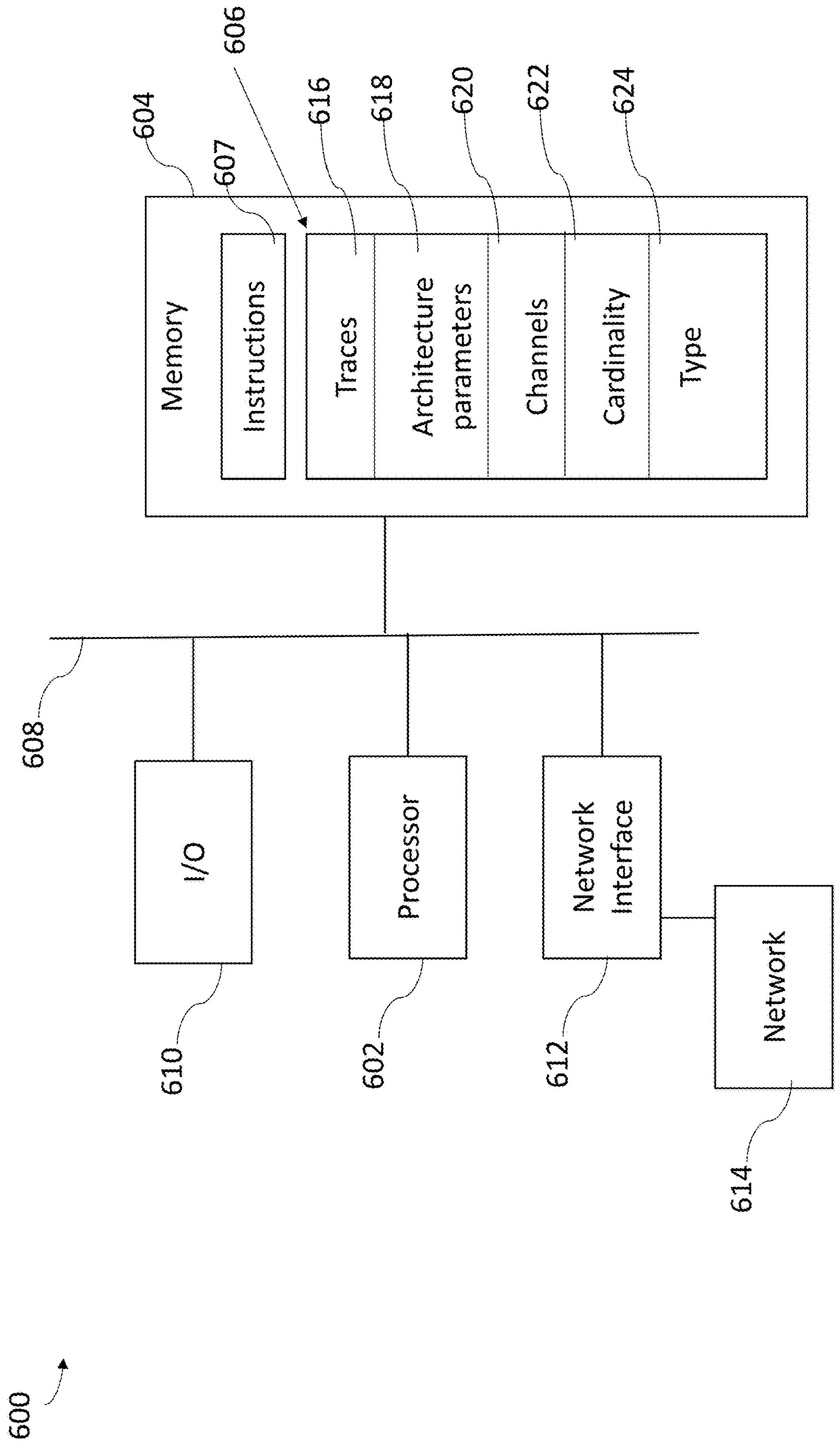
FIG. 6 is a block diagram of a system for implementing a negotiation in accordance with some embodiments.

FIG. 6 is a block diagram of a system 600 for implementing a negotiation in accordance with some embodiments. System 600 includes a hardware processor 602 and a non-transitory, computer readable storage medium 604 encoded with, i.e., storing, the computer program code 606, i.e., a set of executable instructions. Computer readable storage medium 604 is also encoded with instructions 607 for interfacing with external devices, such as mobile terminals.

The processor 602 is electrically coupled to the computer readable storage medium 604 via a bus 608. The processor 602 is also electrically coupled to an I/O interface 610 by bus 608. A network interface 612 is also electrically connected to the processor 602 via bus 608. Network interface 612 is connected to a network 614, so that processor 602 and computer readable storage medium 604 are capable of connecting to external elements via network 614. The processor 602 is configured to execute the computer program code 606 encoded in the computer readable storage medium 604 in order to cause system 600 to be usable for performing a portion or all of the operations as described in method 200 (FIG. 2), the method 300 (FIG. 3), the method 400 (FIG. 4), or the method 500 (FIG. 5).

In some embodiments, the processor 602 is a central processing unit (CPU), a multi-processor, a distributed processing system, an application specific integrated circuit (ASIC), and/or a suitable processing unit.

In some embodiments, the computer readable storage medium 604 is an electronic, magnetic, optical, electromagnetic, infrared, and/or a semiconductor system (or apparatus or device). For example, the computer readable storage medium 604 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 604 includes a compact disk-read only memory (CD-ROM), a compact disk-read/write (CD-R/W), and/or a digital video disc (DVD).

In some embodiments, the storage medium 604 stores the computer program code 606 configured to cause system 600 to perform a portion or all of the operations as described in method 200 (FIG. 2), the method 300 (FIG. 3), the method 400 (FIG. 4), or the method 500 (FIG. 5). In some embodiments, the storage medium 604 also stores information needed for performing a portion or all of the operations as described in method 200 (FIG. 2), the method 300 (FIG. 3), the method 400 (FIG. 4), or the method 500 (FIG. 5) as well as information generated during performing a portion or all of the operations as described in method 200 (FIG. 2), the method 300 (FIG. 3), the method 400 (FIG. 4), or the method 500 (FIG. 5), such as a traces parameter 616, an architecture parameters 618, a channels parameter 620, a cardinality parameter 622, a type parameter 624 and/or a set of executable instructions to perform the operation of a portion or all of the operations as described in method 200 (FIG. 2), the method 300 (FIG. 3), the method 400 (FIG. 4), or the method 500 (FIG. 5).

In some embodiments, the storage medium 604 stores instructions 607 for interfacing with external components. The instructions 607 enable processor 602 to generate instructions readable by the external components to effectively implement a portion or all of the operations as described in method 200 (FIG. 2), the method 300 (FIG. 3), the method 400 (FIG. 4), or the method 500 (FIG. 5).

System 600 includes I/O interface 610. I/O interface 610 is coupled to external circuitry. In some embodiments, I/O interface 610 includes a keyboard, keypad, mouse, trackball, trackpad, and/or cursor direction keys for communicating information and commands to processor 602.

System 600 also includes network interface 612 coupled to the processor 602. Network interface 612 allows system 600 to communicate with network 614, to which one or more other computer systems are connected. Network interface 612 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in method 200 (FIG. 2), the method 300 (FIG. 3), the method 400 (FIG. 4), or the method 500 (FIG. 5) is implemented in two or more systems 600, and information is exchanged between different systems 600 via network 614.

The following non-limiting example is used to assist in understanding an impact of the current description during implementation. One of ordinary skill in the art would understand that the current application is not limited to this example; and that additional implementations are also possible utilizing the current description. In an example automated negotiation, a hospital and a patient determine a date and a time for an appointment for the patient to visit, in person or virtually, the hospital. In such a situation, example negotiation traces include historical data for scheduled appointments as well as previous appointment requests. The scheduled appointments are attainable from patient records or other suitable sources. The previous appointment requests are attainable from voicemails, emails, other electronic requests, notes within a patient file, or other suitable sources. The negotiation traces also include, in some embodiments, availability of one or more doctors at the hospital or doctor specialties. The availability is attainable based on previous appointments, set work schedules, vacation times, and other suitable sources. The doctor specialties are attainable from biographical information about each of the doctors or other suitable sources. In some embodiments, the negotiation traces further include requests from the patient for a specific doctor from the one or more doctors.

One or more neural networks are designed based on network parameters, e.g., determined by the hospital. The one or more neural networks are trained using the negotiation traces indicating previous interactions between the patient and the hospital. Once the one or more neural networks are trained, a system will select a neural network for use in an automated negotiation to set an appointment time for the patient based on a request from the patient. In some embodiments, the request includes information such as a reason for the requested appointment, urgency of the appointment, requests for a certain doctor, or other suitable information.

The selected neural network then performs an automated negotiation to optimize an appointment for the patient which meets the requests of the patient while complying with the availability of doctors at the hospital. During the automated negotiation, the selected neural network determines which offer to make to the patient for an appointment time based on the negotiation traces and the request submitted by the patient. In some embodiments, during the negotiation, the selected neural network is replaced with another neural network in response to the selected neural network exhibiting poor performance. At a termination of the automated negotiation, the neural network has either offered an appointment date and time that is acceptable to the patient or the patient has rejected all offered appointments and is able to seek an appointment at another hospital. In some embodiments, the accepted appointment date and time is automatically logged into the availability for the doctor that will attend the appointment to improve accuracy of appointment scheduling for future patients. In some embodiments, the system provides recommendations for an alternative hospital in response to all offered appointments being rejected.

Supplemental Note 1

A system for selecting and using a neural architecture includes a non-transitory computer readable medium configured to store instructions thereon; and a processor connected to the non-transitory computer readable medium. The processor is configured to execute the instructions for receiving negotiation traces, wherein the negotiation traces include offers from previous negotiations with a target negotiating party. The processor is configured to execute the instructions for training the neural architecture using only the received negotiation traces. The processor is configured to execute the instructions for optimizing an offer to the target negotiating party during a negotiation using the trained neural architecture.

Supplemental Note 2

The system of Supplemental Note 1, wherein the processor is further configured to execute the instructions for generating the neural architecture based on received architecture parameters, wherein the received architecture parameters include an architecture width and an architecture depth, and training the neural architecture comprises training the neural architecture generated based on the received architecture parameters.

Supplemental Note 3

The system of Supplemental Note 1 or 2, wherein the processor is configured to execute the instructions for training a plurality of neural architectures, wherein the plurality of neural architectures includes the neural architecture.

Supplemental Note 4

The system of any of Supplemental Notes 1-3, wherein the processor is configured to execute the instructions for selecting the neural architecture from among the plurality of neural architectures as an optimal neural network based on simulated negotiations amongst the plurality of neural architectures.

Supplemental Note 5

The system of any of Supplemental Notes 1-4, wherein the processor is configured to execute the instructions for determining, during the negotiation, whether an accuracy of the trained neural architecture is satisfactory.

Supplemental Note 6

The system of any of Supplemental Notes 1-5, wherein the processor is configured to execute the instructions for optimizing a next offer, after the offer, using a different trained neural architecture in response to a determination that the accuracy of the trained neural architecture is unsatisfactory.

Supplemental Note 7

The system of any of Supplemental Notes 1-6, wherein the processor is configured to execute the instructions for optimizing a next offer, after the offer, using the trained neural architecture in response to a determination that the accuracy of the trained neural architecture is satisfactory.

Supplemental Note 8

A method of selecting and using a neural architecture includes receiving negotiation traces, wherein the negotiation traces include offers from previous negotiations with a target negotiating party. The method further includes training the neural architecture using only the received negotiation traces. The method further includes optimizing an offer to the target negotiating party during a negotiation using the trained neural architecture.

Supplemental Note 9

The method of Supplemental Note 8, further comprising generating the neural architecture based on received architecture parameters, wherein the received architecture parameters include an architecture width and an architecture depth, and training the neural architecture comprises training the neural architecture generated based on the received architecture parameters.

Supplemental Note 10

The method of Supplemental Note 8 or 9, further comprising training a plurality of neural architectures, wherein the plurality of neural architectures includes the neural architecture.

Supplemental Note 11

The method of any of Supplemental Notes 8-10, further comprising selecting the neural architecture from among the plurality of neural architectures as an optimal neural network based on simulated negotiations amongst the plurality of neural architectures.

Supplemental Note 12

The method of any of Supplemental Notes 8-11, further comprising determining, during the negotiation, whether an accuracy of the trained neural architecture is satisfactory.

Supplemental Note 13

The method of any of Supplemental Notes 8-12, further comprising optimizing a next offer, after the offer, using a different trained neural architecture in response to a determination that the accuracy of the trained neural architecture is unsatisfactory.

Supplemental Note 14

The method of any of Supplemental Notes 8-13, further comprising optimizing a next offer, after the offer, using the trained neural architecture in response to a determination that the accuracy of the trained neural architecture is satisfactory.

Supplemental Note 15

A non-transitory computer readable medium configured to store instructions for selecting and using a neural architecture. The instructions are configured to cause a processor to execute operations including receiving negotiation traces, wherein the negotiation traces include offers from previous negotiations with a target negotiating party. The instructions are configured to cause a processor to execute operations including training the neural architecture using only the received negotiation traces. The instructions are configured to cause a processor to execute operations including optimizing an offer to the target negotiating party during a negotiation using the trained neural architecture.

Supplemental Note 16

The non-transitory computer readable medium of Supplemental Note 15, wherein the operations further comprise generating the neural architecture based on received architecture parameters, wherein the received architecture parameters include an architecture width and an architecture depth, and training the neural architecture comprises training the neural architecture generated based on the received architecture parameters.

Supplemental Note 17

The non-transitory computer readable medium of Supplemental Note 15 or 16, wherein the operations further comprise training a plurality of neural architectures, wherein the plurality of neural architectures includes the neural architecture; an selecting the neural architecture from among the plurality of neural architectures as an optimal neural network based on simulated negotiations amongst the plurality of neural architectures.

Supplemental Note 18

The non-transitory computer readable medium of any of Supplemental Notes 15-17, wherein the operations further comprise determining, during the negotiation, whether an accuracy of the trained neural architecture is satisfactory.

Supplemental Note 19

The non-transitory computer readable medium of any of Supplemental Notes 15-18, wherein the operations further comprise optimizing a next offer, after the offer, using a different trained neural architecture in response to a determination that the accuracy of the trained neural architecture is unsatisfactory.

Supplemental Note 20

The non-transitory computer readable medium of any of Supplemental Notes 15-19, wherein the operations further comprise optimizing a next offer, after the offer, using the trained neural architecture in response to a determination that the accuracy of the trained neural architecture is satisfactory.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for selecting and using one neural architecture among a plurality of neural architectures comprising:

a non-transitory computer readable medium configured to store instructions thereon; and a processor connected to the non-transitory computer readable medium, wherein the processor is configured to execute the instructions for:

receiving negotiation traces, wherein the negotiation traces include offers from previous negotiations with a target negotiating party;

training the one neural architecture using the received negotiation traces with respect to the target negotiating party without using negotiation traces with respect to other negotiation parties;

determining, based on the negotiation traces and a request submitted by the target negotiating party, an offer to the target negotiating party during a negotiation using the trained one neural architecture;

determining, during the negotiation, whether an accuracy of the trained one neural architecture is satisfactory;

determining a next offer, after the offer, using another neural architecture that is a different trained neural architecture in response to a determination that the accuracy of the trained one neural architecture is unsatisfactory; and performing architecture crossover so that one or more nodes from the one neural architecture are imported into the other neural architecture.

2. The system of claim 1, wherein the processor is further configured to execute the instructions for:

generating the one neural architecture based on received architecture parameters, wherein the received architecture parameters include an architecture width and an architecture depth, and training the one neural architecture comprises training the one neural architecture generated based on the received architecture parameters.

3. The system of claim 1, wherein the processor is configured to execute the instructions for:

training the plurality of neural architectures, wherein the plurality of neural architectures includes the one neural architecture.

4. The system of claim 3, wherein the processor is configured to execute the instructions for:

selecting the one neural architecture from among the plurality of neural architectures based on simulated negotiations amongst the plurality of neural architectures.

5. The system of claim 1, wherein the processor is configured to execute the instructions for:

determining a next offer, after the offer, using the trained one neural architecture in response to a determination that the accuracy of the trained one neural architecture is satisfactory.

6. The system of claim 1, wherein the processor is configured to execute the instructions for:

mutating the one neural architecture by adjusting a width or a depth of the one neural architecture in response to an inability to get the one neural architecture to converge with a sufficient degree of accuracy.

7. The system of claim 1, wherein the architecture crossover helps to avoid premature convergence in a situation where the one neural architecture is not satisfactorily accurate.

8. A method of selecting and using one neural architecture among a plurality of neural architectures comprising:

receiving negotiation traces, wherein the negotiation traces include offers from previous negotiations with a target negotiating party;

training the one neural architecture using the received negotiation traces with respect to the target negotiating party without using negotiation traces with respect to other negotiation parties;

determining, based on the negotiation traces and a request submitted by the target negotiating party, an offer to the target negotiating party during a negotiation using the trained one neural architecture;

determining, during the negotiation, whether an accuracy of the trained one neural architecture is satisfactory;

determining a next offer, after the offer, using another neural architecture that is a different trained neural architecture in response to a determination that the accuracy of the trained one neural architecture is unsatisfactory; and performing architecture crossover so that one or more nodes from the one neural architecture are imported into the other neural architecture.

9. The method of claim 8, further comprising:

generating the one neural architecture based on received architecture parameters, wherein the received architecture parameters include an architecture width and an architecture depth, and training the one neural architecture comprises training the one neural architecture generated based on the received architecture parameters.

10. The method of claim 8, further comprising:

training the plurality of neural architectures, wherein the plurality of neural architectures includes the one neural architecture.

11. The method of claim 10, further comprising:

selecting the one neural architecture from among the plurality of neural architectures based on simulated negotiations amongst the plurality of neural architectures.

12. The method of claim 8, further comprising:

determining a next offer, after the offer, using the trained one neural architecture in response to a determination that the accuracy of the trained one neural architecture is satisfactory.

13. The method of claim 8, further comprising:

mutating the one neural architecture by adjusting a width or a depth of the one neural architecture in response to an inability to get the one neural architecture to converge with a sufficient degree of accuracy.

14. The method of claim 8, wherein the architecture crossover helps to avoid premature convergence in a situation where the one neural architecture is not satisfactorily accurate.

15. A non-transitory computer readable medium configured to store instructions for selecting and using one neural architecture among a plurality of neural architectures, wherein the instructions are configured to cause a processor to execute operations comprising:

receiving negotiation traces, wherein the negotiation traces include offers from previous negotiations with a target negotiating party;

training the one neural architecture using only the received negotiation traces with respect to the target negotiating party without using negotiation traces with respect to other negotiation parties;

determining, based on the negotiation traces and a request submitted by the target negotiating party, an offer to the target negotiating party during a negotiation using the trained one neural architecture;

determining, during the negotiation, whether an accuracy of the trained one neural architecture is satisfactory;

determining a next offer, after the offer, using another neural architecture that is a different trained neural architecture in response to a determination that the accuracy of the trained one neural architecture is unsatisfactory; and performing architecture crossover so that one or more nodes from the one neural architecture are imported into the other neural architecture.

16. The non-transitory computer readable medium of claim 15, wherein the operations further comprise:

generating the one neural architecture based on received architecture parameters, wherein the received architecture parameters include an architecture width and an architecture depth, and training the one neural architecture comprises training the one neural architecture generated based on the received architecture parameters.

17. The non-transitory computer readable medium of claim 15, wherein the operations further comprise:

training the plurality of neural architectures, wherein the plurality of neural architectures includes the one neural architecture; and selecting the one neural architecture from among the plurality of neural architectures based on simulated negotiations amongst the plurality of neural architectures.

18. The non-transitory computer readable medium of claim 15, wherein the operations further comprise:

determining a next offer, after the offer, using the trained one neural architecture in response to a determination that the accuracy of the trained one neural architecture is satisfactory.

19. The non-transitory computer readable medium of claim 15, wherein the operations further comprise:

mutating the one neural architecture by adjusting a width or a depth of the one neural architecture in response to an inability to get the one neural architecture to converge with a sufficient degree of accuracy.

20. The non-transitory computer readable medium of claim 15, wherein the architecture crossover helps to avoid premature convergence in a situation where the one neural architecture is not satisfactorily accurate.

* * * * *